United States Patent Office 2,723,968
Patented Nov. 15, 1955

2,723,968

POLYMERIC MATERIALS AND METHOD FOR THE MANUFACTURE THEREOF

John C. Williams, St. Charles, Ill., assignor to Hawley Products Company, St. Charles, Ill., a corporation of Delaware No Drawing. Application November 24, 1951, Serial No. 258,104

15 Claims. (Cl. 260—79.5)

This invention relates to artificial masses, solid or pliable at room temperature (e. g., 25 C.), which become flexible, resilient and elastic at higher temperatures. There is a wide range of articles to which the present invention is suitable, among which, without limiting the invention thereto but for purposes of illustration only, may be mentioned, elastic diaphragms, molding plugs, molding bags, molding blankets and the like, either alone or covulcanized with rubber. It is to be understood, however, that the present invention comprehends applicability to the manufacture of any article to which the invention as described is adapted.

Among the objects of my invention is to provide materials having properties resembling the properties of rubber, i. e., flexible, resilient and elastic at temperatures substantially above room temperature.

Another object is to provide a material of the class described which may be covulcanized with rubber.

A further object is to provide materials which may be covulcanized with rubber to impart to it rigidity at room temperature, contribute to the elasticity at high temperatures, and improve its resistance to the action of oxygen.

A still further object is to make a wide range of materials with the aforementioned properties available so that a choice may be made among them for the particular use contemplated, e. g., temperature range or solvents to be encountered.

An additional object is to provide materials which resemble rubber at high temperatures and which are resistant to the action of oxygen and oxidizing agents.

Another object is to provide materials suitable for coatings, binders or impregnants, alone or covulcanized with rubber.

Another object is to produce products which are brittle at room temperature (e. g., 25° C.) and elastic at temperatures around 150° C. to 170° C.

A further object of the invention is to provide vulcanized plasticized materials which are pliable at room temperature and elastic at temperatures around 150° C. to 160° C. Other objects, advantages and capabilities inherently possessed by the present invention will later more readily become apparent.

Thermoplastic high molecular weight compounds exhibit a transition in properties at certain temperatures. These temperatures are termed transition temperatures and vary with the high molecular weight compound and the presence of plasticizer in the compound. Below the transition temperature, the thermoplastic material is a substantially non-elastic solid; in the region of the transition temperature the high molecular weight compound exhibits properties resembling those of rubber, i. e., flexible, resilient and elastic; above the transition temperature, the material is plastic and can readily be made to flow.

The transition temperature for polystyrene is approximately 80° C., for polyvinyl acetate it is 40° C., and for polymethylmethacrylate it is 65° C. in the absence of plasticizers. Elastomers such as polyisobutylene and rubber show transition temperatures which are distinguished by being below room temperature. This invention is particularly concerned with the modification of thermoplastic high molecular weight materials with transition temperatures at or above room temperature. To further define these materials, examples are given as follows: polyvinyl alcohol, polyvinyl acetals, polystyrene, the polymers of the esters of acrylic and methacrylic acids, ethyl cellulose, cellulose acetate, polyvinylidene chloride, polyvinyl carbazol, and similar high molecular weight thermoplastic materials.

The flow exhibited by thermoplastic resins above their transition temperature has sharply limited the use of these materials in high temperature applications, although the aliphatic saturated nature of thermoplastics makes them much more resistant to the action of oxygen at high temperature than is rubber.

In the present invention chemical open chain carbon-to-carbon unsaturation is introduced in minor amounts in the thermoplastic high molecular weight compound and the resulting thermoplastic material is vulcanized with sulfur. The open chain unsaturation may be introduced into the main chain, or as side chain unsaturation, preferably the latter.

The vulcanization may be performed on the unsaturated thermoplastic alone, or the thermoplastic may be compounded with rubber before vulcanization. Plasticizers, antioxidants, stabilizers, and the usual rubber compounding chemicals may be introduced before vulcanization. The properties of the vulcanized thermoplastic high molecular weight compounds depend to a large extent on the transition temperature of the original thermoplastic. When the temperature of the material is below the transition temperature, it is a hard inelastic mass. When the temperature is raised substantially above the transition temperature the materials are highly extensible and resilient.

This invention therefore makes available materials having the chemical resistance of the thermoplastics along with typical properties resembling those of rubber for high temperature applications.

In introducing the chemical unsaturation into the thermoplastic high molecular weight compound several methods may be employed.

Chemical groups may be split off the molecule, unsaturated groups may be added as side chains, or the unsaturation may be introduced by copolymerizing the appropriate vinyl compound monomer with small proportions of a 1–3 diene or a divinyl compound which does not contain conjugated carbon unsaturation. In the copolymerization methods, the unsaturated component is to be kept under 20% by weight of the isoprene or an equivalent amount of other compound containing equivalent unsaturation. In other words, the maximum quantity of the unsaturated component containing aliphatic carbon-to-carbon double bonds should be such as to produce open chain unsaturation equal to the unsaturation supplied by isoprene when the latter is copolymerized in amounts less than 20% with a vinyl compound. The minimum amount of said aliphatic unsaturated component is sufficient to produce a product capable of being vulcanized with rubber compounding ingredients, including sulfur, until a thermoplastic material is obtained. In these two methods, the conditions of the reaction are regulated so that extensive cross-linking of the resin chains does not take place. Cross-linking results in gel formation.

Some methods of introducing unsaturation and vulcanization of the resulting unsaturated thermoplastic high molecular weight compounds are illustrated in the following examples in which the quantities are stated in parts by weight unless otherwise indicated.

Example 1

153 grams redistilled vinyl acetate (1.78 mols), 30 grams redistilled divinyl ether (.42 mol), 1 gram benzoyl peroxide and 300 grams ethyl acetate are refluxed gently for four hours, there being 36% yield on the monomers. The unreacted monomers are boiled off under vacuum and the thermoplastic mass dissolved in ethyl acetate. The following reagents are added to 100 parts of the material: 5 parts sulfur, 3 parts stearic acid, 10 parts Gastex, 5 parts zinc oxide, 1 part Tuads (tetramethylthiuramdisulfide) and 0.5 part Captax (mercaptobenzothiazole). The suspension is ball milled, the solvent removed and the compound vulcanized one hour at 150° C. The product is hard and brittle at room temperature, but rubbery and resilient at from 150° C. to 180° C.

It will be seen from the above example that the vinyl acetate and the divinyl ether have been copolymerized. The benzoyl peroxide has functioned as a catalyst to initiate the reaction. The ethyl acetate has functioned as a solvent and has prevented extensive cross-linking from occurring. The copolymer which possesses an essentially linear molecular structure is unsaturated in the side chains. The unsaturation is of importance because it allows sulfur vulcanization to be carried out. In this the copolymer differs from unmodified polyvinyl acetate which is not unsaturated and which cannot be vulcanized with sulfur. I am able to use typical rubber compounding ingredients and procedure with my modified thermoplastic high molecular weight compound.

Sulfur is added to the unsaturated material as the vulcanizing agent; stearic acid is added as a lubricant; Gastex (which is carbon black) is added as a pigment; zinc oxide serves as an activator; and Tuads and Captax function as accelerators.

While I have referred to compounding in a solvent in a ball mill, I wish it understood that in the preferred form, typical rubber compounding equipment may be used. The ball mill was used here because of the small sample.

It will thus be seen that I have transformed polyvinyl acetate from a material which has little utility at high temperatures because at high temperatures it is tacky and plastic, into a material which possesses great utility at high temperatures. In addition this high temperature elastic, extensible and resilient material is largely chemically saturated and consequently has good resistance to oxygen.

Example 2

101 grams redistilled vinyl acetate (1.17 mols), 15 grams redistilled divinyl ether (.208 mol), 1 gram benzoyl peroxide and 206 grams of ethyl acetate are gently refluxed for five hours, there being a yield of 46% on the monomers. The unreacted monomers are vacuum-boiled off and to 100 parts of the unsaturated thermoplastic material are added 5 parts sulfur, 5 parts zinc oxide, 3 parts stearic acid, 1 part Tuads and 0.5 part Captax. Ethyl acetate is added and the compound is ball milled four hours. The solvent is evaporated and the material mold vulcanized at 160° C. for one and one-half hours. The vulcanized product is stiff and brittle at room temperature but highly extensible at 170° C.

The above comments as to Example 1, also apply generally to Example 2, except that in Example 2 the omission of Gastex has resulted in a more highly extensible material at high temperature.

Example 3

112 grams of styrene (1.01 mols), 164 grams of a divinyl benzene solution (10% in diethyl benzene) (.13 mol) and 2 grams benzoyl peroxide are heated under reflux, with stirring, at 140° C. to 160° C. for six hours. The product is highly viscous. Yield 49%. The solution is diluted with toluene and to 100 parts resin is added 5 parts sulfur, 5 parts zinc oxide, 3 parts stearic acid, 1 part Tuads and 0.5 part Captax. The suspension is ball milled four hours and the toluene and diethyl benzene removed. The compound is vulcanized one hour at 160° C., and gives a material hard and brittle at room temperature, but elastic and extensible at 160° C.

In Example 3 it will be observed that the base material is polystyrene. However, the inclusion of divinyl benzene has resulted in side chain unsaturation in the copolymer. In the absence of solvent divinyl benzene would have caused cross-linking. In the presence of solvent (here diethyl benzene) cross-linking is repressed and an essentially straight chain unsaturated molecule is produced. The unsaturation is of value because it allows sulfur vulcanization to be carried out. Typical rubber compounding ingredients and typical rubber compounding methods and apparatus are advantageously usable. In view of the high softening temperatures of this copolymer, and the others of the present invention, compounding may be carried out on a hot rubber mill.

It is to be noted that I have transformed the base material (polystyrene) from a material which is tacky and plastic at high temperatures, and therefore has little utility at high temperatures, into a valuable and versatile high temperature elastic, extensible and resilient material. Moreover, this material is saturated in the main molecular chain and therefore has good resistance to oxygen, or oxidizing conditions.

Example 4

101 grams styrene (1 mol), 5 grams isoprene (.07 mol) and 0.5 gram benzoyl peroxide are refluxed gently three hours with stirring, the resulting product being highly viscous. Yield 66%. To 100 parts of this product are added 5 parts sulfur, 3 parts stearic acid, 5 parts zinc oxide, 2 parts Tuads and 0.5 part Captax. The suspension is diluted with toluene and ball milled. The solvent is next removed and the compound vulcanized one-half hour at 130° C. The vulcanized material strips readily from the mold. It is highly elastic at 130° C., but stiff and brittle at room temperature.

In this example a different method of introducing the unsaturation into the base material (polystyrene) is used. The copolymerization carried out with a small amount of isoprene results in the introduction of main chain unsaturation. While main chain unsaturation is perhaps not as desirable from a theoretical standpoint as side chain unsaturation; from a practical standpoint, if the main chain unsaturation is kept low, the resistance of the copolymer to oxygen is good. The unsaturated copolymer may now be compounded and vulcanized as in the preceding examples, and the base material (poylstyrene) is again transformed from a material which has little utility at high temperatures into a material the properties of which resemble the properties of rubber at high temperatures.

Example 5

101 grams redistilled methyl acrylate (1.18 mols), 3.5 grams isoprene (.051 mol) and 0.4 gram benzoyl peroxide are refluxed gently with stirring for two hours. The solution becomes highyl viscous and is diluted with ethyl acetate to a gasoline-like consistency. Heating is continued for one hour. Yield 39.8%. To 100 parts of the thermoplastic material is added 5 parts sulfur, 10 parts zinc oxide, 2.5 parts stearic acid, 0.5 part Captax and 1 part Tuads. This is ball milled, the solvent removed and the solid material vulcanized one hour at 150° C. The product is highly elastic at 150° C. and leathery at room temperatures.

In this example isoprene is copolymerized with methyl acrylate. As in the preceding examples benzoyl peroxide acts as a catalyst to initiate the reaction. The cross-linking action of a carbon compound containing two or more carbon-to-carbon double bonds as manifest by gel formation is more pronounced toward the end of the polymerization. In this example, as soon as the danger of excessive cross-linking develops, this tendency is repressed by addition of the solvent ethyl acetate. It will be recognized that the unsaturated, essentially uncross-linked copolymer could be produced without the use of solvent by interrupting the reaction before the point of undesirable cross-linking is reached but the extent of polymerization would be less. This unsaturated thermoplastic is vulcanized as before referred to, and in the process is changed from a material which is tacky and plastic at high temperatures, to a material which possesses the properties of rubber at high temperatures. The essentially saturated nature of the vulcanizate results in good resistance to oxidation.

*Example 6*

75 grams redistilled methyl acrylate (.87 mol), 28 grams styrene (.25 mol), 3 grams isoprene (.044 mol), and 0.5 benzoyl peroxide is heated three hours until a highly viscous solution results. This is diluted with ethyl acetate to a gasoline-like consistency and the heating continued for four hours. 76% yield. The resultant product after removal of the solvent is a thermoplastic and threads can be drawn from it at 130° C. These threads are so pliable that knots can be tied in them. To 100 parts of this material is added 5 parts sulfur, 10 parts zinc oxide, 1 part Tuads, 2.5 parts stearic acid and 0.5 part Captax, the compounding being carried out on a rubber mill. The compound is vulcanized one-half hour at 160° The product is strong and rubber-like at 160° C. and brittle at room temperature.

The general principles here involved are similar to those of Example 5, except that the thermoplastic base is itself a copolymer (of methyl acrylate and styrene). The improved properties resulting from copolymerizing unlike monomers are here taken advantage of, and as before, the unsaturation is introduced by including a small amount of the 1–3 diene (isoprene). Compounding and vulcanization have, as before, transformed a material generally useless at high temperatures to one usable and valuable at high temperatures.

*Example 7*

40 grams of high viscosity polyvinyl alcohol is dissolved in 800 grams of water and 30 grams of butyraldehyde added. 20 cc. of 4% HCl is stirred in and a white coherent precipitate is formed. This is removed, cut into fine pieces and returned to the solution along with 100 grams of 10% acrolein in water. The material is now heated to 60° C. with stirring for four hours.

The reaction product is separated, washed and dissolved in 400 grams acetone, 400 grams ethyl alcohol and 20 grams Flexol D. O. P. (dioctyl phthalate). The solution is ball milled four hours with 2.5 grams sulfur, 5 grams zinc oxide, 1.5 stearic acid, 0.5 gram Tuads, and 0.25 gram Captax.

The solvent is evaporated and the product vulcanized one hour at 160° C. The vulcanizate is pliable and slightly elastic at room temperature and highly elastic at 160° C. Samples immersed in ethyl alcohol-acetone exhibit the following behaviour:

|  | 20 Minutes | 10 Hours |
|---|---|---|
| Unheated | | |
| ½ hour at 160° C | dissolved | |
| 1 hour at 160° C | swelled | swelled and tendered. |
| | do | Do. |

In this example the base material is not being synthesized, but a commercial resin (polyvinyl alcohol) is being used. The first step is the formation of the butyral of the polyvinyl alcohol. Hydrochloric acid acts as the catalyst in this step and in the succeeding step. It should be pointed out that after the reaction with butyraldehyde reactive hydroxyl groups still exist in the resin. Acrolein is caused to react with these. The acrolein reaction is used for the purpose of introducing unsaturation, which will permit vulcanization to be carried out. The effect of vulcanization is shown in the above table. It should be pointed out that the use of acrolein alone would give extensive cross-linking, but that the first reaction with butyraldehyde prevents this.

*Example 8*

300 grams high viscosity polyvinyl alcohol (du Pont RH 403) is dissolved in 3000 grams water and to this is added 206 grams of butyraldehyde and 200 grams of 10% aqueous acrolein. 20 cc. of concentrated hydrochloric acid is now added and the solution is held at 55° C. for twenty minutes. A heavy plastic precipitate forms which is collected, washed and dried. This material is compounded with the following materials: to 100 parts material, 8 parts zinc oxide, 0.8 part Altax (benzothiazyl disulfide), 0.4 part Tuads, 0.4 part Captax, 4 parts Age Rite Resin (aldol-alphanaphthyl amine), 1.3 parts stearic acid, 2 parts sulfur, and 21 parts Flexol D. O. P.

This worked on a hot rubber mill and vulcanized one hour at 150° C. The vulcanizate is inelastic at room temperature, but elastic and extensible at 150° C. The vulcanized material and a portion of the material as it comes from the rubber mill are placed in a mixture of 50 alcohol—50 acetone overnight. The unvulcanized portion dissolves, the vulcanized portion becomes tender, but does not lose its form.

In several of the examples given herein, due to the fact that small quantities of the high molecular weight compound were involved, compounding was done in a ball mill in the presence of solvents. However, when using larger quantities of the material typical rubber processing equipment may be used.

It will be observed in the examples that the quantity of the modifying unsaturated aliphatic carbon compound varies in the following manner:

| Example | Approximate Percent Added Modifying Unsaturated Component |
|---|---|
| 1 | 16.4 |
| 2 | 12. |
| 3 | 12.8 |
| 4 | 4.6 |
| 5 | 3.8 |
| 6 | 2.9 |
| 7 | 12. |
| 8 | 3.8 |

Thus the quantity of the modifying unsaturated monomeric component based on the total weight of the reactants varies within the range from about 3% to about 16% in the examples given. It is preferable to employ the unsaturated modifying component in amounts of at least 3% but not more than 20% by weight of the total reactants.

The preferred materials which are modified for the purpose of the invention are vinyl compounds characterized by the presence of a single

group capable of polymerizing to form a thermoplastic polymer having a transition temperature in excess of about 40° C. The ordinary thermoplastic polymer is characterized by an essentially straight chain and saturation. The polymers resulting from the present invention prior to vulcanization contain side chain and/or main chain unsaturation in a minor proportion effective for vulcanization but insufficient for cross-linking effective to form a gel. The modifying agent used to introduce the unsaturation preferably contains a plurality of aliphatic carbon-to-carbon double bonds. Good results have been obtained with modifying agents containing two double bonds, especially in those cases where the thermoplastic polymer is formed and unsaturation is introduced simultaneously. Where a polymer is preformed before addition of the modifying unsaturated component, mono-unsaturated modifiers have given very good results. Thus, in Examples 7 and 8 products resembling artificial leather at ordinary temperatures and rubbery at high temperatures were obtained.

The relative proportion of the unsaturated modifying component weighted as to the amount of unsaturation, on the basis of total monomeric reactants, can be determined by calculations from Examples 1 to 6 to be within the range of 26.6% (Example 2) to 7.1% (Example 6). Thus, in Example 1 vinyl acetate (molecular weight 86) and divinyl ether (molecular weight 72) are reacted in the proportion of 1.78 mols to .42 mol, respectively, but the divinyl ether contains two double bonds while the vinyl acetate contains only one. In terms of double bond molecular equivalents the total reactants equal $$1.78 + (2 \times .42)$$

or .84, a total of 2.62. The fraction which is diunsaturation is $$\frac{.42}{2.62} = .16 \text{ or } 16\%$$

Similarly, the relative proportion of diunsaturation can be ascertained in the other examples.

It can also be calculated from the examples that the proportion of the reactant containing at least two centers of open chain carbon-to-carbon double bond unsaturation such as divinyl ether, divinyl benzene, and isoprene, may vary within the range of about 0.03 mol to about .23 mol per mol of the monomeric reactants having a single center of open chain carbon-to-carbon double bond unsaturation, for example, styrene, vinyl acetate and methyl acrylate. It will be observed that the monomeric reactants having a single center of open chain unsaturation are capable of polymerization to hemicolloids, i. e., to polymers having at least 20 to 100 units per polymer molecule.

The kind and proportion of the solvent employed to prevent cross-linking are subject to the following generalizations. The solvent must be inert to the reactants. It must be capable of dissolving all of the monomeric reactants. It is immaterial whether it dissolves the end products. In fact, the products are easier to separate when they are insoluble in the solvent. Mixtures of solvents can be used. The preferred solvents where one of the monomeric reactants is vinyl acetate are saturated inert aliphatic acetates such as, for example, ethyl acetate, butyl acetate and amyl acetate. Where one of the initial monomeric reactants is styrene the preferred solvents are alkylated benzenes, for example, ethyl benzene or diethyl benzene. Subject to the foregoing qualifications other solvents may be employed alone or in admixture with the solvents previously mentioned, for example, xylene, toluene and similar solvents which are essentially immiscible with water, do not contain open chain unsaturation and are inert to the reactants. If the solvent has a known tendency to inhibit self-polymerization of a monomer having a single center of open chain unsaturation as is the case with some ketones, it is not regarded as being inert for the purpose of the present invention. The essential function of the solvent as employed in the practice of the present invention is to dilute the reaction mixture to such an extent that the molecules will not be packed closely enough to cross-link and therefore the resultant product will contain practically zero cross-linkage. At the same time, however, the solvent does not interfere with the introduction of open chain unsaturation.

In the examples, the catalyst used is a well known type of self-polymerization catalyst sometimes referred to as an oxygen-supplying catalyst. That is to say, catalysts of this type are capable of decomposing to produce nascent oxygen in the reaction mixture. It will be understood that other catalysts of a similar type may be employed, examples being inorganic peroxides, such as hydrogen peroxide; persalts, such as percabonates, perborates, persulfates; and organic peroxides, such as peracetic acid, acetyl peroxide, benzoyl peroxide, benzoyl acetyl peroxide, lauryl peroxide, cumene hydroperoxide, tertiary butyl hydroperoxide, succinyl peroxide, and mixtures thereof.

Polymerization reactions in most cases do not proceed to completion. For the purpose of the present invention it is desirable that the reaction be carried on until 30% to 80% of the monomeric reactants have copolymerized without substantially cross-linking.

In carrying out the reaction it is preferable to employ a sufficient amount of solvent to maintain a gasoline-like consistency in the reaction mixture. If the amount of solvent is too small and the reaction proceeds to the point where a honey-like consistency is observed before 30% polymerization has been effected, additional quantities of solvent can be added in order to avoid gelation and permit the reaction to continue without cross-linking. Although the quantities of solvent required can vary depending upon the reactants, good results have been obtained by using a weight ratio of solvent to reactants of at least 1.5:1. The volume ratio of solvent to reactants is preferably at least 1:1.

It will be recognized that the thermoplastic polymers having a transition point of 40° C. or more can form in situ during the reaction and the introduction of open chain unsaturation to form a copolymer can take place simultaneously. The fact that the unsaturated organic compound having a single center of unsaturation is capable of self-polymerization to form a polymer in situ does not interfere with the addition of an unsaturated open chain to form a copolymer. The same is true where the thermoplastic material which is formed in situ is a copolymer (as in Example 6). On the other hand, in some cases in order to preform a linear polymer having side chain unsaturation it is desirable to form the thermoplastic material having a transition temperature above 40° C. before reacting it with a material capable of introducing side chain unsaturation (for instance, as in Examples 7 and 8).

In general, the molar ratio of the monomer which is used to introduce unsaturation into the copolymer to the monomer or total monomers which form the major proportion of the copolymer will be within the range of .03:1 to .23:1.

I wish it understood that in the examples given above, rubber may be compounded with the materials of my invention at the same time that the rubber compounding ingredients are added. The examples given above have actually been carried out with the successful achievement of the results and objects set forth therein and with the successful accomplishment of the various objects and purposes referred to in this application. The invention as described herein is illustrative only, as it is capable of many possible variations, modifications and changes without departing from the spirit thereof.

This invention is a continuation-in-part of my copending application Serial No. 726,738, filed February 5, 1947, which is a continuation-in-part of Serial No. 499,121, filed August 18, 1943, both of said patent applications now being abandoned.

The invention is hereby claimed as follows:

1. The method of producing a polymeric composition which comprises copolymerizing one molar portion of a vinyl compound having a single center of open chain carbon-to-carbon double bond unsaturation and capable of self-polymerization and .03 to .23 molar portion of an organic compound having at least two centers of open chain carbon-to-carbon double bond unsaturation in the presence of an oxygen supplying catalyst and a quantity of a solvent inert to the reactants effective to substantially prevent cross-linking, the volume ratio of said solvent to total reactants being at least 1:1, and vulcanizing the resultant copolymer with rubber compounding ingredients including sulfur to form a thermoelastic material.

2. The thermoelastic products resulting from the method claimed in claim 1.

3. The method of making a polymeric composition which comprises copolymerizing a vinyl compound from the group consisting of vinyl acetate, styrene and methyl acrylate capable of polymerizing to form a thermoplastic polymer having a transition temperature in excess of 40° C. and from about 3% to 20% by weight of a compound from the group consisting of divinylbenzene, divinyl ether and isoprene, carrying out the polymerization in the presence of an organic peroxide catalyst and a quantity of a solvent inert to the reactants effective to substantially prevent cross-linking, the volume ratio of said solvent to total reactants being at least 1:1, and vulcanizing the resultant copolymer with rubber compounding ingredients including sulfur to form a thermoelastic material.

4. The thermoelastic products resulting from the method claimed in claim 3.

5. The method of making a polymeric composition which comprises copolymerizing vinyl acetate and from about 3% to 20% by weight of divinyl ether in the presence of an organic peroxide catalyst and a quantity of ethyl acetate effective to substantially prevent cross-linking, the volume ratio of said ethyl acetate to total vinyl acetate and divinylether being at least 1:1, and vulcanizing the resultant copolymer with rubber compounding ingredients including sulfur to form a thermoelastic material.

6. The thermoelastic products resulting from the method claimed in claim 5.

7. The method of making a polymeric composition which comprises copolymerizing styrene and from about 3% to 20% by weight of divinyl benzene in the presence of an organic peroxide catalyst and a quantity of diethyl benzene effective to substantially prevent cross-linking, the volume ratio of diethyl benzene to total styrene and divinyl benzene being at least 1:1, and vulcanizing the resultant copolymer with rubber compounding ingredients including sulfur to form a thermoelastic material.

8. The thermoelastic products resulting from the method claimed in claim 7.

9. The method of making a polymeric composition which comprises copolymerizing methyl acrylate and about 3% to 4.6% by weight of isoprene in the presence of an organic peroxide catalyst and a quantity of ethyl acetate effective to substantially prevent cross-linking, the volume ratio of ethyl acetate to total methyl acrylate and isoprene being at least 1:1, and vulcanizing the resultant copolymer with rubber compounding ingredients including sulfur to form a thermoelastic material.

10. The thermoelastic products resulting from the method claimed in claim 9.

11. The method of making a polymeric composition which comprises copolymerizing methyl acrylate, styrene and isoprene, the quantity of isoprene being within the range of from about 3% to 4.6% by weight of the total methyl acrylate and styrene, carrying out the polymerization in the presence of an organic peroxide catalyst and a quantity of ethyl acetate effective to substantially prevent cross-linking, the volume ratio of ethyl acetate to total methyl acrylate and styrene being at least 1:1, and vulcanizing the resultant copolymer with rubber compounding ingredients including sulfur to form a thermoelastic material.

12. The thermoelastic products resulting from the method claimed in claim 11.

13. A copolymer comprising a vinyl compound from the group consisting of vinyl acetate, styrene and methyl acrylate capable of polymerizing to form a thermoplastic polymer having a transition temperature in excess of 40° C. copolymerized with from about 3% to 20% by weight of a compound from the group consisting of divinyl benzene, divinyl ether and isoprene in the presence of an oxygen supplying catalyst and a solvent inert to the reactants, the volume ratio of said solvent to the total reactants being at least 1:1, said composition being characterized by freedom from cross-linking and being adapted when vulcanized with rubber compounding ingredients including sulfur to form a thermoelastic material.

14. A new composition of matter comprising vinyl acetate copolymerized with from about 3% to 20% by weight of divinyl ether in the presence of an organic peroxide catalyst and a quantity of an inert solvent effective to substantially prevent cross-linking, the volume ratio of said solvent to the total reactants being at least 1:1.

15. A new composition of matter comprising styrene copolymerized with about 3% to 20% by weight of divinyl benzene in the presence of an organic peroxide catalyst and a quantity of an inert solvent effective to substantially prevent cross-linking, the volume ratio of said solvent to the total reactants being at least 1:1.

References Cited in the file of this patent

UNITED STATES PATENTS 2,200,429   Perrin et al. _____ May 14, 1940

OTHER REFERENCES

Ser. No. 202,011, Mertens (A. P. C.), published Apr. 20, 1943.